United States Patent
Chen et al.

(10) Patent No.: US 11,822,043 B2
(45) Date of Patent: Nov. 21, 2023

(54) RADIATION INSPECTION APPARATUS COMPRISING A RADIATION INSPECTION DEVICE AND WHEELS AND RADIATION INSPECTION METHOD

(71) Applicants: NUCTECH (BEIJING) COMPANY LIMITED, Beijing (CN); NUCTECH COMPANY LIMITED, Beijing (CN); TSINGHUA UNIVERSITY, Beijing (CN)

(72) Inventors: Zhiqiang Chen, Beijing (CN); Yuanjing Li, Beijing (CN); Li Zhang, Beijing (CN); Jianmin Li, Beijing (CN); Shangmin Sun, Beijing (CN); Chunguang Zong, Beijing (CN); Yu Hu, Beijing (CN); Quanwei Song, Beijing (CN); Hejun Zhou, Beijing (CN); Weifeng Yu, Beijing (CN); Jinguo Cao, Beijing (CN); Bing Fu, Beijing (CN)

( * ) Notice: Subject to any disclaimer, the term of this patent is extended or adjusted under 35 U.S.C. 154(b) by 217 days.

(21) Appl. No.: 17/420,681

(22) PCT Filed: Jan. 3, 2020

(86) PCT No.: PCT/CN2020/070279
§ 371 (c)(1),
(2) Date: Jul. 5, 2021

(87) PCT Pub. No.: WO2020/140972
PCT Pub. Date: Jul. 9, 2020

(65) Prior Publication Data
US 2022/0099601 A1   Mar. 31, 2022

(30) Foreign Application Priority Data
Jan. 4, 2019   (CN) .......................... 201910008952.0

(51) Int. Cl.
*G01N 23/04* (2018.01)
*G01N 23/083* (2018.01)
(Continued)

(52) U.S. Cl.
CPC .......... *G01V 5/0066* (2013.01); *G01N 23/04* (2013.01); *G01N 23/083* (2013.01);
(Continued)

(58) Field of Classification Search
CPC .... G01N 23/04; G01N 23/046; G01N 23/083; G01N 23/087; G01N 23/10; G01N 23/18;
(Continued)

(56) References Cited

U.S. PATENT DOCUMENTS

| 5,917,876 A | 6/1999 | Fujii et al. |
| 6,843,599 B2 * | 1/2005 | Le ........................ G01V 5/0008 378/102 |

(Continued)

FOREIGN PATENT DOCUMENTS

| CN | 1304037 A | 7/2001 |
| CN | 104749649 A | 7/2015 |

(Continued)

OTHER PUBLICATIONS

An English translation of CN108732192A by Patent Translate. (Year: 2023).*

(Continued)

*Primary Examiner* — Allen C. Ho
(74) *Attorney, Agent, or Firm* — KILPATRICK TOWNSEND & STOCKTON, LLP

(57) ABSTRACT

The present disclosure provides a radiation inspection apparatus and a radiation inspection method. The radiation inspection apparatus includes: a radiation inspection device comprising a ray source and a detector that cooperates with the ray source to perform scanning inspection on an object (Continued)

US 11,822,043 B2
Page 2 to be inspected, the radiation inspection device having an inspection channel for the object to be inspected to pass through when scanning inspection is performed thereon; and traveling wheels provided at the bottom of the radiation inspection device to enable the radiation inspection apparatus to travel in an extension direction of the inspection channel, and the traveling wheels are configured to rotate 90° to enable the radiation inspection apparatus to travel in a direction perpendicular to the extension direction of the inspection channel.

11 Claims, 6 Drawing Sheets

(51) Int. Cl.
  *G01N 23/087* (2018.01)
  *G01N 23/10* (2018.01)
  *G01V 5/00* (2006.01)
  *G01N 23/18* (2018.01)
(52) U.S. Cl.
  CPC .......... *G01N 23/087* (2013.01); *G01N 23/10* (2013.01); *G01N 23/18* (2013.01); *G01V 5/0008* (2013.01); *G01V 5/0016* (2013.01); *G01V 5/0041* (2013.01); *G01N 2223/04* (2013.01); *G01N 2223/3303* (2013.01); *G01N 2223/40* (2013.01); *G01N 2223/639* (2013.01)
(58) Field of Classification Search
  CPC ....... G01N 2223/04; G01N 2223/3303; G01N 2223/40; G01N 2223/639; G01V 5/0016; G01V 5/0025; G01V 5/0033; G01V 5/0041; G01V 5/005; G01V 5/0066
  USPC ..................... 378/57, 58, 196–198
  See application file for complete search history.

(56) References Cited

U.S. PATENT DOCUMENTS

| | | | | |
|---|---|---|---|---|
| 6,928,141 B2* | 8/2005 | Carver | G01N 23/087 378/197 |
| 7,039,159 B2* | 5/2006 | Muenchau | G01N 23/04 378/57 |
| 7,302,035 B2* | 11/2007 | Hu | G01V 5/0016 378/57 |
| 7,308,076 B2* | 12/2007 | Studer | G01V 5/0016 378/114 |
| 7,322,745 B2* | 1/2008 | Agrawal | G01V 5/0008 378/102 |
| 7,352,843 B2* | 4/2008 | Hu | G01V 5/0008 378/57 |
| 7,369,643 B2* | 5/2008 | Kotowski | G01V 5/0008 378/197 |
| 7,379,530 B2* | 5/2008 | Hoff | G01V 5/0016 378/57 |
| 7,386,092 B2* | 6/2008 | Kang | G01V 5/0008 378/197 |
| 7,400,701 B1* | 7/2008 | Cason | G01N 23/20 378/57 |
| 7,453,987 B1* | 11/2008 | Richardson | G01V 5/0041 378/57 |
| 7,460,639 B2* | 12/2008 | Tudor | G01V 5/0083 250/359.1 |
| 7,483,511 B2* | 1/2009 | Bendahan | G01V 5/0016 378/57 |
| 7,497,618 B2* | 3/2009 | Chen | G01V 5/0016 378/57 |
| 7,519,147 B1* | 4/2009 | Aloisio | G01V 5/0083 378/57 |
| 7,526,064 B2* | 4/2009 | Akery | G01V 5/0066 378/57 |
| 7,551,715 B2* | 6/2009 | Rothschild | G01V 5/0016 378/57 |
| 7,596,275 B1* | 9/2009 | Richardson | G06T 7/0008 378/57 |
| 7,642,526 B2* | 1/2010 | Xu | G01C 21/00 378/197 |
| 7,660,386 B2* | 2/2010 | Meng | G01V 5/0008 378/197 |
| 7,663,109 B2* | 2/2010 | Kang | G01V 5/0016 250/359.1 |
| 7,677,857 B2* | 3/2010 | Takehara | G01N 23/046 378/57 |
| 7,688,945 B2* | 3/2010 | Chen | G01V 5/0066 378/57 |
| 7,702,070 B2* | 4/2010 | Kang | G01V 5/005 378/57 |
| 7,706,502 B2* | 4/2010 | Bueno | G01V 5/0016 378/57 |
| 7,734,008 B1* | 6/2010 | Sanders | G01V 5/0016 378/57 |
| 7,742,568 B2* | 6/2010 | Smith | G01N 23/087 378/57 |
| 7,780,390 B2* | 8/2010 | Fujiwara | G01V 5/0008 378/57 |
| 7,783,004 B2* | 8/2010 | Kotowski | G01N 23/04 378/57 |
| 7,819,580 B2* | 10/2010 | Song | G01V 5/0016 378/57 |
| 7,984,940 B2* | 7/2011 | Chen | E05D 5/02 378/57 |
| 8,023,619 B2* | 9/2011 | McNabb, Jr. | G01N 23/04 378/97 |
| 8,275,092 B1* | 9/2012 | Zhang | G01N 23/203 378/57 |
| 8,295,433 B2* | 10/2012 | Linev | G01V 5/0033 378/57 |
| 8,300,763 B2* | 10/2012 | Shedlock | G01N 23/046 378/57 |
| 8,340,245 B2* | 12/2012 | Herranz | G01V 5/005 378/57 |
| 8,345,819 B2* | 1/2013 | Mastronardi | G01V 5/0008 378/57 |
| 8,439,565 B2* | 5/2013 | Mastronardi | G01V 5/0016 378/57 |
| 8,457,274 B2* | 6/2013 | Arodzero | G01V 5/0041 378/53 |
| 8,472,583 B2* | 6/2013 | Star-Lack | G01V 5/005 378/57 |
| 8,582,720 B2* | 11/2013 | Morton | G21K 1/043 378/57 |
| 8,615,067 B2* | 12/2013 | Hayes | G01V 5/0008 378/57 |
| 8,731,137 B2* | 5/2014 | Arroyo, Jr. | G01V 3/08 378/57 |
| 8,824,632 B2* | 9/2014 | Mastronardi | G01V 5/0058 378/57 |
| 8,831,176 B2* | 9/2014 | Morton | G01N 23/203 378/57 |
| 8,971,485 B2* | 3/2015 | Morton | G01V 5/0041 378/57 |
| 8,971,487 B2* | 3/2015 | Mastronardi | G01V 5/0008 378/57 |
| 9,036,779 B2* | 5/2015 | Morton | G21K 1/02 378/150 |
| 9,381,963 B2* | 7/2016 | Wu | G01V 5/0016 |
| 9,989,668 B2* | 6/2018 | Sun | G01V 5/0016 |
| 2007/0269007 A1 | 11/2007 | Akery | |
| 2015/0204999 A1 | 7/2015 | Sun et al. | |

FOREIGN PATENT DOCUMENTS

| | | |
|---|---|---|
| CN | 108732192 A | 11/2018 |
| CN | 109521480 A | 3/2019 |

(56) References Cited

FOREIGN PATENT DOCUMENTS

| | | |
|---|---|---|
| CN | 209765071 U | 12/2019 |
| GB | 2575992 A | 2/2020 |
| WO | 2018121081 A1 | 7/2018 |

OTHER PUBLICATIONS

International Search Report of PCT No. PCT/CN2020/070279.
Examination report under Section 18 (3) dated May 18, 2022 of UK Application No. GB2109852.0.
First OA dated May 24, 2023 corresponding to CN Application No. 201910008952.0.

* cited by examiner

RADIATION INSPECTION APPARATUS COMPRISING A RADIATION INSPECTION DEVICE AND WHEELS AND RADIATION INSPECTION METHOD

CROSS-REFERENCES TO RELATED APPLICATIONS

The present disclosure is a national phase application of International Application No. PCT/CN2020/070279, filed on Jan. 3, 2020, which claims priority to Chinese patent application No. 201910008952.0 filed on Jan. 4, 2019, the disclosure of which is hereby incorporated in its entirety.

FIELD

The present disclosure relates to the field of radiation inspection technology, in particular to a radiation inspection apparatus and a radiation inspection method.

BACKGROUND

In the prior art, in the field of radiation inspection technology that uses a ray to perform scanning inspection on vehicles, containers and other objects to be inspected, modes of scanning inspection on the objects to be inspected include a unidirectional scanning mode and a bidirectional scanning mode. The two scanning modes can only achieve scanning of one row of objects to be inspected, but cannot achieve continuous scanning of a plurality of rows of objects to be inspected, resulting in low use efficiency of a radiation inspection apparatus. Moreover, radiation inspection on the objects to be inspected cannot be carried out in an opposite direction without moving the objects to be inspected. In addition, the inspection viewing angle is unitary, which is not conducive to scanned image analysis of complex goods within the objects to be inspected.

SUMMARY

An object of the present disclosure is providing a radiation inspection apparatus and a radiation inspection method.

One embodiment of the present disclosure provides a radiation inspection apparatus, including:

a radiation inspection device including a ray source and a detector that cooperates with the ray source to perform scanning inspection on an object to be inspected, the radiation inspection device having an inspection channel configured to allow the object to be inspected to pass through when scanning inspection is performed thereon; and traveling wheels provided at the bottom of the radiation inspection device to enable the radiation inspection apparatus to travel in an extension direction of the inspection channel, and the traveling wheels are configured to rotate 90° to enable the radiation inspection apparatus to travel in a direction perpendicular to the extension direction of the inspection channel.

In some embodiments, the radiation inspection apparatus rotates 180° to turn around.

In some embodiments, the ray source is configured and an included angle between a ray beam emitted therefrom and the extension direction of the inspection channel is variable, and the position of the detector is variable with the angular variation of the ray beam.

In some embodiments, the ray source is configured and the included angle between the ray beam emitted therefrom and the extension direction of the inspection channel is variable in the range of 90±θ°, where 0<θ≤15°.

In some embodiments, the radiation inspection device includes a transmissive inspection device, a ray source and a detector of the transmissive inspection device being respectively located on two sides of the inspection channel and connected by an arm rack, the arm rack configured to cause the detector to move so that the position of the detector is variable with the angular variation of the ray beam.

In some embodiments,
a scanning speed of the radiation inspection apparatus is variable; and/or
a beam-exit frequency of the ray source is variable.

Another of the present disclosure provides a radiation inspection method using the radiation inspection apparatus described in any item of an embodiment of the present disclosure, the method including:

performing scanning inspection on a row of plurality of objects to be inspected by the radiation inspection apparatus;

after the scanning inspection on the row of plurality of objects to be inspected is completed, causing traveling wheels of the radiation inspection apparatus to rotate 90° in situ and enabling the radiation inspection device to travel in a direction perpendicular to an extension direction of an inspection channel to a position where the inspection channel aligns with another row of plurality of objects to be inspected; and causing the radiation inspection apparatus to perform scanning inspection on the another row of plurality of objects to be inspected.

In some embodiments, the step of performing scanning inspection on a row of plurality of objects to be inspected by the radiation inspection apparatus includes causing the row of plurality of objects to be inspected to pass from one end to the other end of the inspection channel to perform scanning inspection on a first side opposite to the first side of the row of plurality of objects to be inspected.

In some embodiments, the step of performing scanning inspection on a row of plurality of objects to be inspected by the radiation inspection apparatus further includes after the scanning inspection on the first side of the row of plurality of objects to be inspected is completed, the radiation inspection apparatus rotating 180° to turn around, and causes the row of plurality of objects to be inspected to pass from the other end to the one end of the inspection channel to perform scanning inspection on a second side of the row of plurality of objects to be inspected.

In some embodiments, the step of performing scanning inspection on a row of plurality of objects to be inspected by the radiation inspection apparatus includes rotating a ray beam from the ray source of the radiation inspection device to cause a variation in an included angle between the ray beam and the extension direction of the inspection channel, and changing the position of the detector with the angular variation of the ray beam to perform scanning inspection at various angles on the objects to be inspected.

In some embodiments, the included angle between the ray beam and the extension direction of the inspection channel is variable in the range of 90±θ°, where 0<θ≤15°.

In some embodiments, the step of performing scanning inspection on a row of plurality of objects to be inspected by the radiation inspection apparatus includes at least one of the following steps:

changing a scanning speed of the radiation inspection apparatus;

changing a beam-exit frequency of the ray source.

Based on the radiation inspection apparatus and the radiation inspection method provided in the present disclosure, after scanning inspection on a row of plurality of objects to be inspected (such as a first row of vehicles) is completed, the traveling wheels rotate 90°, and the radiation inspection apparatus as a whole moves in the direction perpendicular to the extension direction of the inspection channel (also called lateral direction) after rotation in place; when the radiation inspection apparatus automatically moves laterally to another row of plurality of objects to be inspected (such as a second row of vehicles), the traveling wheels rotate 90°, and then scanning inspection is performed on another row of plurality of objects to be inspected; and by successively executing the above-mentioned steps, continuous scanning inspection can be performed on a plurality of rows of objects to be inspected to improve the use efficiency of the radiation inspection apparatus.

Other features and advantages of the present disclosure will become apparent from the following detailed description of exemplary embodiments of the present disclosure with reference to the accompanying drawings.

BRIEF DESCRIPTION OF THE DRAWINGS

Drawings described here are used to provide further understanding of the present disclosure and form a part of the present application. Illustrative embodiments of the present disclosure and description thereof are used for explaining the present disclosure, but do not improperly limit the present disclosure. In the drawings.

DETAILED DESCRIPTION OF THE INVENTION

Figure 1:
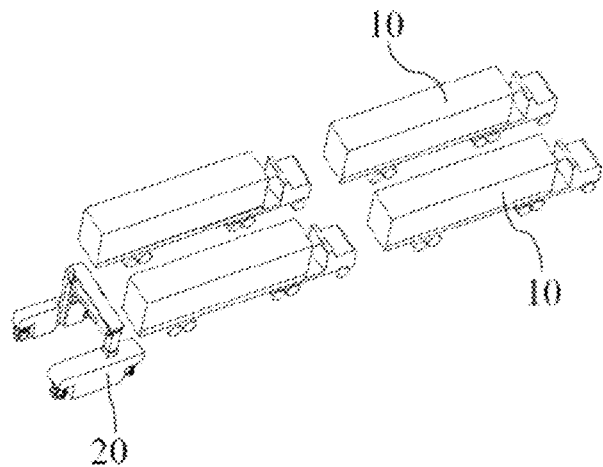
FIG. 1 is a schematic structure diagram of a radiation inspection apparatus in an embodiment of the present disclosure during scanning inspection on a row of plurality of objects to be inspected.

Embodiments will be described below clearly and completely in conjunction with the accompanying drawings in the embodiments of the present disclosure. The described embodiments are only a part of the embodiments of the present application, and not all the embodiments. The following description of at least one exemplary embodiment is actually only illustrative, and in no way serves as any limitation on the present disclosure and its application or use.

Unless stated otherwise, the relative arrangement of components and steps, numerical expressions and numerical values set forth in these embodiments do not limit the scope of the present disclosure. Furthermore, it should be appreciated that, for ease of description, the sizes of various parts shown in the drawings are not drawn in accordance with actual proportional relationships. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once an item is defined in one drawing, it does not need to be further discussed in subsequent drawings.

In the description of the present disclosure, it should be understood that the use of terms such as "first" and "second" to define parts and components is only for the convenience of distinguishing the corresponding parts and components. Unless otherwise stated, the above terms have no special meanings, and therefore cannot be understood as limitations on the protection scope of the present disclosure.

In description of the present disclosure, it should be understood that orientation terms such as "front", "rear", "upper", "lower", "left", "right", "transverse", "longitudinal", "vertical", "horizontal", "top" and "bottom" are merely for the convenience of describing the present disclosure and simplifying description, and unless stated to the contrary, such terms do not indicate or imply the denoted devices or elements must have specific orientations or be constructed and operated in specific orientations, and thus cannot be understood as limiting the protection scope of the present disclosure; and orientation terms "inner" and "outer" refer to the inside and outside with respect to the contour of each component itself.

FIGS. 1 to 13 illustrate the structure and working principle of a radiation inspection apparatus 20 of embodiments of the present disclosure.

As shown in FIGS. 1 to 13, the radiation inspection apparatus 20 of the embodiments of the present disclosure mainly includes a radiation inspection device and traveling wheels.

The radiation inspection device includes a ray source and a detector that cooperates with the ray source to perform scanning inspection on an object to be inspected 10, and the radiation inspection device has an inspection channel for the object to be inspected 10 to pass through when scanning inspection is performed thereon. The expression "pass through" means that the object to be inspected 10 passes through relative to the radiation inspection device. It may be that the radiation inspection apparatus 20 is stationary and the object to be inspected 10 moves, or the radiation inspection apparatus 20 moves and the object to be inspected 10 is stationary, or the radiation inspection apparatus 20 and the object to be inspected 10 moves at the same time.

Figure 2:
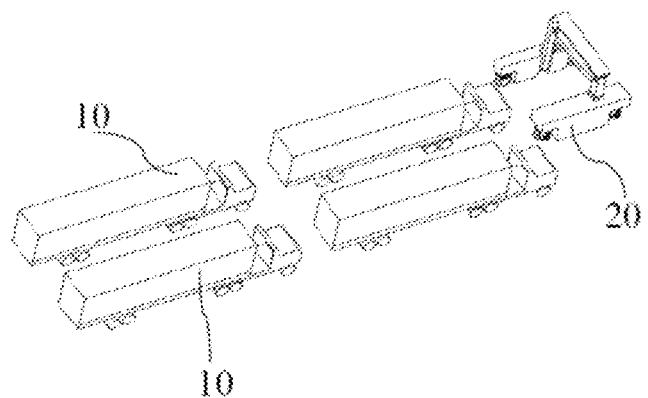
FIG. 2 is a schematic structure diagram of the radiation inspection apparatus shown in FIG. 1 traveling laterally to a position where an inspection channel aligns with another row of plurality of objects to be inspected, after the scanning inspection on the row of plurality of objects to be inspected is completed.

As shown in FIGS. 1 to 4, the traveling wheels are provided at the bottom of the radiation inspection device to enable the radiation inspection apparatus 20 to travel in an extension direction of the inspection channel. As shown in FIGS. 1 and 2, the traveling wheels are configured to rotate 90° to enable the radiation inspection apparatus 20 to travel in a direction perpendicular to the extension direction of the inspection channel.

After the radiation inspection apparatus 20 of the present disclosure completes scanning inspection on a row of plurality of objects to be inspected 10 (such as a first row of vehicles), the traveling wheels rotate 90°, and the radiation inspection apparatus 20 as a whole moves in the direction perpendicular to the extension direction of the inspection channel (also called lateral direction, while the extension direction of the inspection channel being longitudinal direction) after rotation in place; when the radiation inspection apparatus 20 automatically moves laterally to another row of plurality of objects to be inspected 10 (such as a second row of vehicles), the traveling wheels rotate 90 degrees, and then scanning inspection is performed on another row of plurality of objects to be inspected 10; and by successively executing the aforementioned steps, continuous scanning inspection can be performed on a plurality of rows of objects to be inspected 10 to improve the use efficiency of the radiation inspection apparatus 20.

The object to be inspected 10 may be a vehicle, container or other goods.

Figure 3:
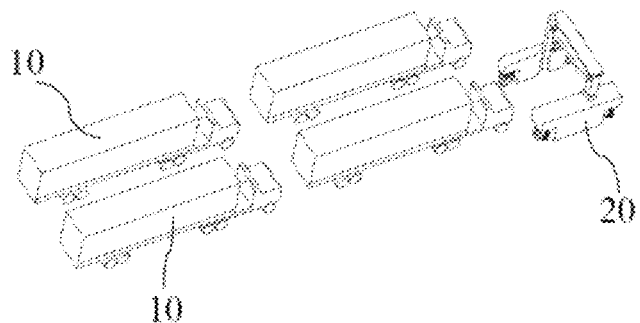
FIG. 3 is a schematic structure diagram of the radiation inspection apparatus shown in an embodiment of the present disclosure during scanning inspection on a row of plurality of objects to be inspected, when scanning inspection on a first side is completed.
Figure 4:
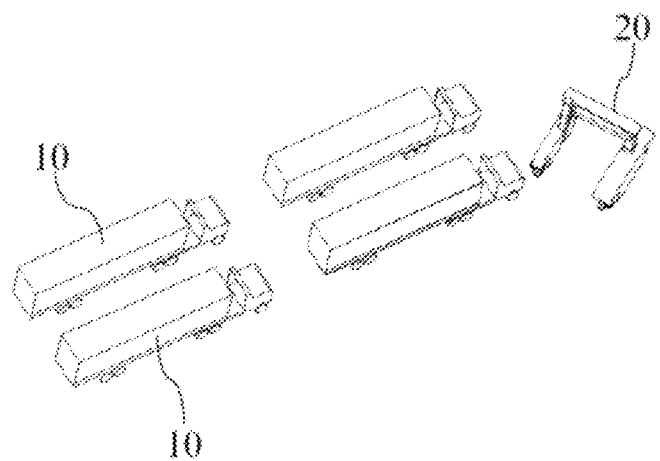
FIG. 4 is a schematic structure diagram of the radiation inspection apparatus shown in FIG. 3 when rotating an angle to turn around.

As shown in FIGS. 3 and 4, the radiation inspection apparatus 20 rotates 180° to turn around. With this configuration, after completing an scanning inspection operation on the object to be inspected 10, the radiation inspection apparatus 20 can rotates 180 degrees and perform scanning inspection on the object to be inspected 10 again, and the ray source performs scanning inspection on the object to be inspected 10 in forward and reverse directions respectively to form two scanned images at different viewing angles, thus achieving double-side scanning on the object to be inspected 10.

Figure 5:
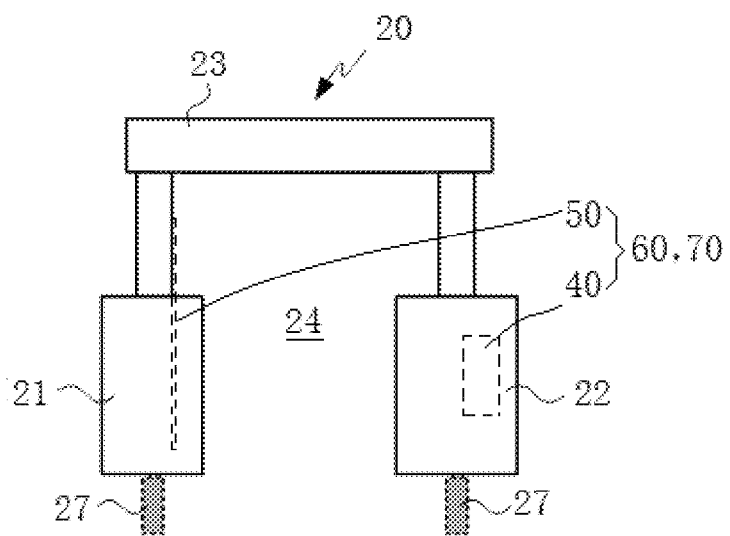
FIG. 5 is a structure diagram of a radiation inspection apparatus in an embodiment of the present disclosure.

FIG. 5 is a structure diagram of a radiation inspection apparatus 20 in an embodiment of the present disclosure. As shown in FIG. 5, the radiation inspection apparatus 20 includes a first vehicle body 21, a second vehicle body 22, a ray source, an arm rack 23, and a detector. A door-shaped structure formed by the first vehicle body 21, the second vehicle body 22 and the arm rack 23, and areas extended therefrom in the longitudinal direction form an inspection channel 24 for an object to be inspected 10 to pass through when scanning inspection is performed thereon. The ray source is provided in the first vehicle body 21 to emit a high-energy ray beam, such as an X-ray or a y-ray. The detector 50 may be provided on the arm rack 23 and/or the first vehicle body 21 to receive the ray beam emitted from the ray source.

Referring to FIG. 5, the radiation inspection apparatus 20 further includes four traveling wheels 27, and the four traveling wheels 27 include two groups of two wheels, provided on the first vehicle body 21 and the second vehicle body 22 respectively. In this embodiment, each of the traveling wheels 27 may rotate at least 90 degrees in the clockwise direction and in the counterclockwise direction, and each of the traveling wheels 27 is a driving wheel. Each of the traveling wheels 27 may be driven by a travel motor to achieve a traveling function, and driven by a rotation motor to achieve a steering function. The travel motors and rotation motors may be servo motors.

To control the radiation inspection apparatus 20, the radiation inspection apparatus 20 may include a controller to control rotating speeds and steering angles of the traveling wheels. In some embodiments, the controller may receive status parameters of the first vehicle body 21 and the second vehicle body 22 provided by detection devices, to control the rotating speeds and steering angles of the traveling wheels 27 based on the status parameters. In some other embodiments, the controller may also receive a control instruction from a remote-control platform (such as an industrial personal computer) or a remote control to control the rotating speeds and steering angles of the traveling wheels 27.

The detection devices may include an angle encoder, an accelerometer, a gyroscope, and the like, to detect the moving speed, acceleration, rotating angle, angular speed of rotation, angular acceleration and the like of the driving wheels or the radiation inspection apparatus 20, and may also include a positioning element based on infrared light, laser, ultrasound, vision, a buried magnetic stripe or GPS, to acquire the position, posture, or the like of the driving wheels or the radiation inspection apparatus 20. These detection devices may be provided within the radiation inspection apparatus 20. The detection devices may also include a detection element provided outside the radiation inspection apparatus 20, such as a camera provided in a venue. Status parameters such as a current moving position, moving speed/acceleration, and moving posture of the radiation inspection apparatus 20 may be collected by the detection devices to achieve control by the remote-control platform or the controller within the radiation inspection apparatus 20.

The number of the traveling wheels is not limited to four, but may be any other number so long as the functions required in the present disclosure can be achieved.

FIGS. 6 to 10 are top-view structure diagrams of the radiation inspection apparatus shown in FIG. 5, with traveling wheels being at various angles.

Figure 6:
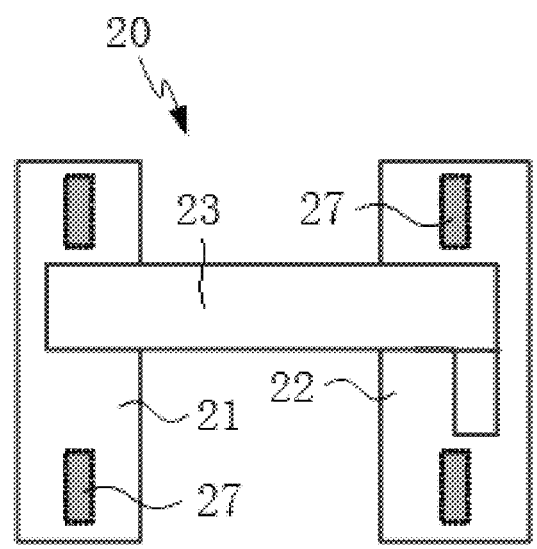
FIGS. 6 to 10 are top-view structure diagrams of the radiation inspection apparatus shown in FIG. 5, with traveling wheels being at different steering angles.

In FIG. 6, the traveling directions of the four traveling wheels 27 are same as the extension direction of the inspection channel 24. The directions of the four traveling wheels 27 in FIG. 6 represents a state when the radiation inspection apparatus travels along an arrangement direction of the objects to be inspected during inspection of the objects to be inspected.

Figure 7:
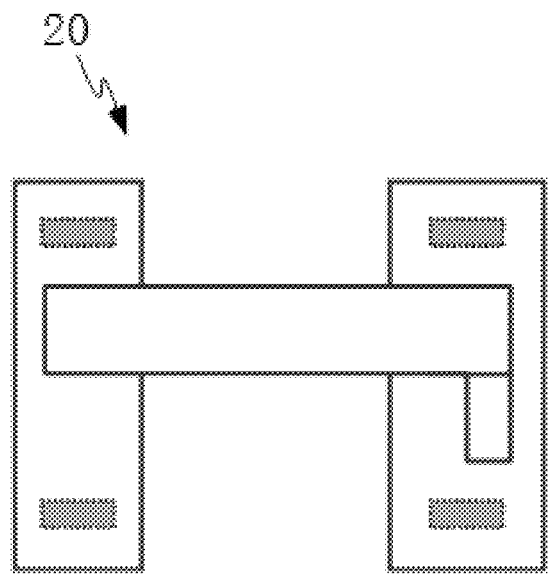

The traveling directions of the four traveling wheels 27 in FIG. 7 are perpendicular to the extension direction of the inspection channel. That is, in FIG. 7 relative to FIG. 6, the traveling wheels 27 rotate 90° to enable the radiation inspection apparatus 20 to travel in the direction perpendicular to the extension direction of the inspection channel 24.

Figure 8:
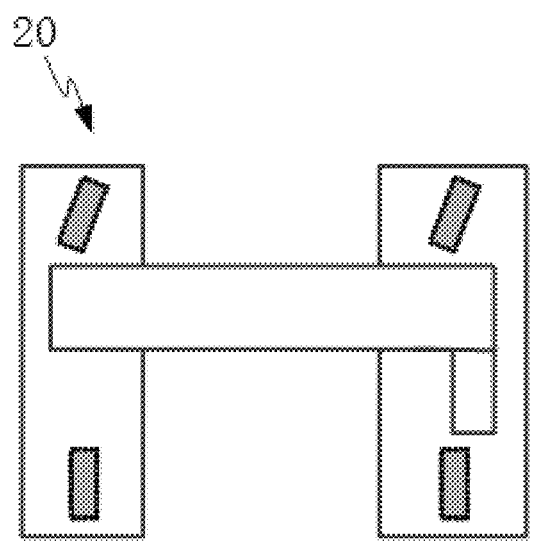
Figure 9:
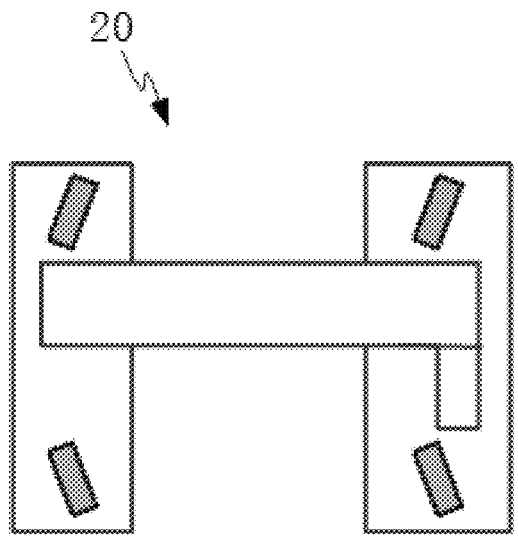
Figure 10:
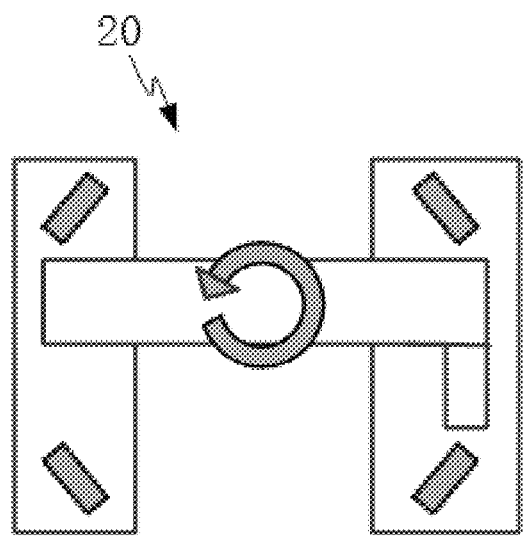

All the rotating angles of the traveling wheels shown in FIGS. 8 to 10 can achieve turnaround of the radiation inspection apparatus.

In FIG. 8 compared with FIG. 6, of the four traveling wheels, two traveling wheels located on a side of the ray beam are inclined toward a same direction with respect to the extension direction of the inspection channel 24.

In FIG. 9 compared with FIG. 6, all the four traveling wheels 27 are inclined with respect to the extension direction of the inspection channel 24, and inclination directions of two traveling wheels located on a side of the ray beam are same, and inclination directions of two traveling wheels 27 located on the other side of the ray beam are same but opposite to the inclination directions of the other two traveling wheels 27.

In FIG. 10 compared with FIG. 6, outer sides (sides away from the ray beam) of the four traveling wheels are inclined close to the extension direction the inspection channel 24. The setting of the steering angles of the traveling wheels 27 in FIG. 10 can achieve rotation compared with the steering angles of the traveling wheels 27 in FIGS. 8 and 9.

Figure 11:
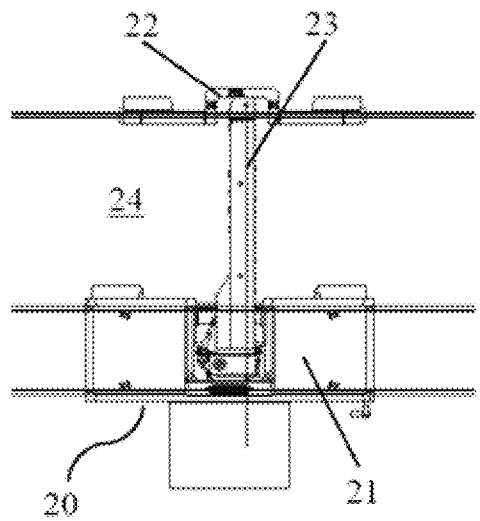
FIG. 11 is a schematic structure diagram of the radiation inspection apparatus shown in an embodiment of the present disclosure during scanning inspection on a row of plurality of objects to be inspected, with a ray beam emitted by a ray source in a direction perpendicular to the extension direction of the inspection channel.
Figure 12:
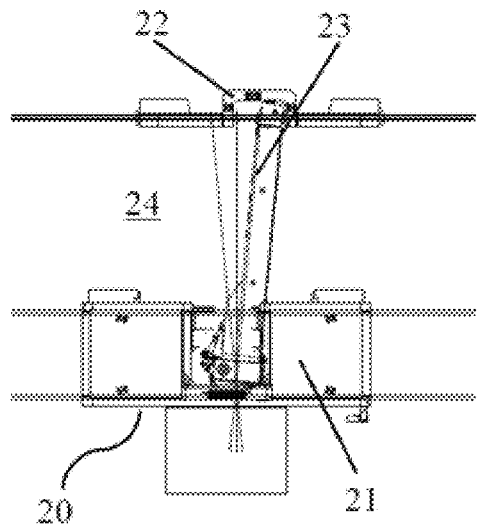
FIG. 12 is a schematic structure diagram of the radiation inspection apparatus shown in FIG. 11 during scanning inspection on a row of plurality of objects to be inspected, with the ray beam emitted by the ray source in a direction deflected from the lateral direction and inclined toward a side thereof.
Figure 13:
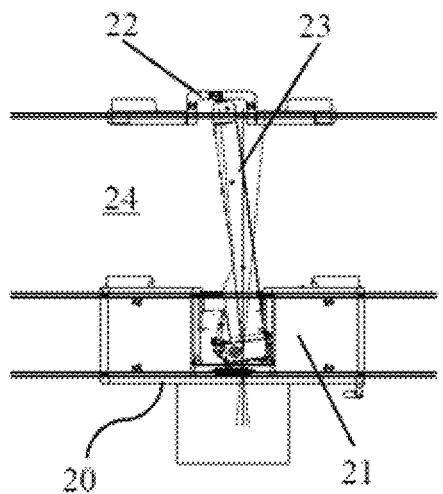
FIG. 13 is a schematic structure diagram of the radiation inspection apparatus shown in FIG. 11 during scanning inspection on a row of plurality of objects to be inspected, with the ray beam emitted by the ray source in a direction deflected from the lateral direction and inclined toward the other side thereof.

FIG. 11 is a schematic structure diagram of the radiation inspection apparatus 20 shown in an embodiment of the present disclosure during scanning inspection on a row of plurality of objects to be inspected 10, with the ray beam emitted by the ray source in a direction perpendicular to the extension direction of the inspection channel. FIG. 12 is a schematic structure diagram of the radiation inspection apparatus 20 shown in FIG. 11 during scanning inspection on a row of plurality of objects to be inspected 10, with the ray beam emitted by the ray source in a direction deflected from the lateral direction and inclined toward one side thereof. FIG. 13 is a schematic structure diagram of the radiation inspection apparatus 20 shown in FIG. 11 during scanning inspection on a row of plurality of objects to be inspected 10, with the ray beam emitted by the ray source in a direction deflected from the lateral direction and inclined toward the other side thereof.

As shown in FIGS. 11 to 13, the ray source is configured and an included angle between the ray beam emitted therefrom and the extension direction of the inspection channel is variable, and the position of the detector is variable with the angular variation of the ray beam. In some embodiments, the included angle between the ray beam and the extension direction of the inspection channel is variable in the range of 90±θ°, where θ is an acute angle greater than zero, for example 0<θ≤15°.

During scanning inspection on an object to be inspected 10 by the radiation inspection apparatus 20, the ray beam from the radiation source may be variable in the range of 90±θ°, to form scanned images at different viewing angles of the object to be inspected 10 at a same scanning position, which can achieve small angle scanning on the object to be inspected 10 and is favorable to acquiring more detailed local scanning information of the object to be inspected 10.

As shown in FIGS. 11 to 13, in some embodiments, the radiation inspection device includes a transmissive inspection device, a ray source and a detector of the transmissive inspection device being respectively located on two sides of the inspection channel and connected by the arm rack. The arm rack causes the detector to move so that the position of the detector is variable with the angular variation of the ray beam.

In FIGS. 11 to 13, the ray source is provided on the first vehicle body 21, and the detector is provided on the arm rack 23. The door-shaped frame formed by the first vehicle body 21, the second vehicle body 22 and the arm rack 23, and areas extended therefrom in the longitudinal direction form the inspection channel 24 for the object to be inspected 10 to pass through when scanning inspection is performed thereon.

In some embodiments, a scanning speed of the radiation inspection apparatus 20 is variable; and/or a beam-exit frequency of the ray source is variable. This setting is conducive to obtaining scanned images with corresponding definition according to inspection needs. For example, the radiation inspection apparatus 20 and the ray source may be respectively set at a standard scanning speed and a standard beam-exit frequency that are often used for scanning inspection on an object to be inspected 10, and on the basis of the standard scanning speed or beam-exit frequency of the radiation inspection apparatus 20 for the object to be inspected 10, more fine scanning on the object to be inspected 10 is achieved by reducing the scanning speed and/or increasing the beam-exit frequency of the ray source, and forming clearer scanned images.

An embodiment of the present disclosure further provides a radiation inspection method using the radiation inspection apparatus 20 of the present disclosure, the method including:

the radiation inspection apparatus 20 performing scanning inspection on a row of plurality of objects to be inspected 10;

after the scanning inspection on the row of plurality of objects to be inspected 10 is completed, causing traveling wheels of the radiation inspection apparatus 20 to rotate 90° in situ and enabling the radiation inspection device to travel in a direction perpendicular to an extension direction of an inspection channel (lateral direction) to a position where the inspection channel aligns with another row of plurality of objects to be inspected 10; and causing the radiation inspection apparatus 20 to perform scanning inspection on the another row of plurality of objects to be inspected 10.

In some embodiments, the radiation inspection apparatus 20 performing scanning inspection on a row of plurality of objects to be inspected 10 includes causing the row of plurality of objects to be inspected 10 to pass from one end to the other end of the inspection channel to perform scanning inspection on a first side of the row of plurality of objects to be inspected 10.

In some embodiments, the radiation inspection apparatus 20 performing scanning inspection on a row of plurality of objects to be inspected 10 further includes after the scanning inspection on the first side of the row of plurality of objects to be inspected 10 is completed, the radiation inspection apparatus 20 rotating 180° to turn around, and causing the row of plurality of objects to be inspected 10 to pass from the other end to the one end of the inspection channel to perform scanning inspection on a second side opposite to the first side of the row of plurality of objects to be inspected 10.

The radiation inspection apparatus 20 and radiation inspection method of the embodiments of the present disclosure not only can achieve single-side radiation inspection on the objects to be inspected 10 to form single-side scanned images of the objects to be inspected 10, but also can achieve double-side scanning inspection on the objects to be inspected 10 to form double-side scanned images of the objects to be inspected 10.

In some embodiments, the radiation inspection apparatus 20 performing scanning inspection on a row of plurality of objects to be inspected 10 includes rotating a ray beam from the ray source of the radiation inspection device to cause a variation in an included angle between the ray beam and the extension direction of the inspection channel, and changing the position of the detector with the angular variation of the ray beam to perform scanning inspection at various angles on the objects to be inspected 10. In some embodiments, the included angle between the ray beam and the extension direction of the inspection channel is variable in the range of 90±θ°, where θ is an acute angle greater than zero. In some embodiments, 0<θ≤15°.

In some embodiments, the radiation inspection apparatus 20 performing scanning inspection on a row of plurality of objects to be inspected 10 includes changing a scanning speed of the radiation inspection apparatus 20; and/or changing a beam-exit frequency of the ray source.

The scanning inspection method of the embodiment of the present disclosure has same advantages as the radiation inspection apparatus 20 of the embodiment of the present disclosure.

The radiation inspection device and radiation inspection method of the above embodiments of the present disclosure can achieve continuous scanning, reciprocating scanning, single-side scanning, double-side scanning, and small angle scanning on a plurality of rows of objects to be inspected. Compared with the existing radiation inspection apparatus and radiation inspection method, the present disclosure has the beneficial effects that the use efficiency of the radiation inspection apparatus is improved; and the objects to be inspected can be scanned and imaged at more viewing angles, so that more complete scanning information can be obtained to improve the accuracy of inspecting dangerous and smuggled goods, and the ease of use of the product is improved.

What is claimed is:

1. A radiation inspection apparatus, comprising:
a radiation inspection device comprising:
a ray source and a detector that cooperates with the ray source to perform a scanning inspection on an object to be inspected, the radiation inspection device having an inspection channel configured to allow the object to be inspected to pass through when the scanning inspection is performed thereon; and
traveling wheels provided at a bottom of the radiation inspection device to enable the radiation inspection device to travel in an extension direction of the inspection channel, wherein the traveling wheels are configured to rotate 90° to enable the radiation inspection device to travel in a direction perpendicular to the extension direction of the inspection channel;
wherein the ray source is configured such that an included angle between a ray beam emitted therefrom and the extension direction of the inspection channel is variable, and a position of the detector is variable with an angular variation of the ray beam.

2. The radiation inspection apparatus according to claim 1, wherein the radiation inspection device rotates 180° to turn around.

3. The radiation inspection apparatus according to claim 1, wherein the ray source is configured such that the included angle between the ray beam emitted therefrom and the extension direction of the inspection channel is variable in a range of $90\pm\theta°$, where $0<\theta\leq15°$.

4. The radiation inspection apparatus according to claim 1, further comprising:
an arm rack configured to cause the detector to move so that the position of the detector is variable with the angular variation of the ray beam,
wherein the radiation inspection device comprises a transmissive inspection device, in which the ray source and the detector being respectively located on two sides of the inspection channel and connected by the arm rack.

5. The radiation inspection apparatus according to claim 1, wherein
a scanning speed of the radiation inspection apparatus is variable; and/or
a beam-exit frequency of the ray source is variable.

6. A radiation inspection method using a radiation inspection apparatus, the radiation inspection apparatus comprising:
a radiation inspection device comprising:
a ray source and a detector that cooperates with the ray source to perform a scanning inspection on an object to be inspected, the radiation inspection device having an inspection channel configured to allow the object to be inspected to pass through when the scanning inspection is performed thereon; and
traveling wheels provided at a bottom of the radiation inspection device to enable the radiation inspection device to travel in an extension direction of the inspection channel, wherein the traveling wheels are configured to rotate 900 to enable the radiation inspection device to travel in a direction perpendicular to the extension direction of the inspection channel;
the radiation inspection method comprising:
performing a scanning inspection on a row of a plurality of objects to be inspected by the radiation inspection apparatus;
after the scanning inspection on the row of the plurality of objects to be inspected is completed, causing the traveling wheels of the radiation inspection device to rotate 90° in situ and enabling the radiation inspection device to travel in a direction perpendicular to an extension direction of an inspection channel to a position, where the inspection channel aligns with another row of the plurality of objects to be inspected; and
causing the radiation inspection device to perform a scanning inspection on another row of the plurality of objects to be inspected.

7. The radiation inspection method according to claim 6, wherein the step of performing a scanning inspection on a row of a plurality of objects to be inspected by the radiation inspection apparatus comprises: causing the row of the plurality of objects to be inspected to pass from one end to another end of the inspection channel to perform a scanning inspection on a first side of the row of the plurality of objects to be inspected.

8. The radiation inspection method according to claim 7, wherein the step of performing a scanning inspection on a row of a plurality of objects to be inspected by the radiation inspection apparatus further comprises: after the scanning inspection on the first side of the row of the plurality of objects to be inspected is completed, rotating the radiation inspection device 180° to turn around, and causing the row of the plurality of objects to be inspected to pass from another end to the one end of the inspection channel to perform a scanning inspection on a second side opposite to the first side of the row of the plurality of objects to be inspected.

9. The radiation inspection method according to claim 6, wherein the step of performing a scanning inspection on a row of a plurality of objects to be inspected by the radiation inspection apparatus comprises:
rotating a ray beam from the ray source of the radiation inspection device to cause a variation in an included angle between the ray beam and the extension direction of the inspection channel, and changing a position of the detector with an angular variation of the ray beam to perform a scanning inspection at various angles on the row of the plurality objects to be inspected.

10. The radiation inspection apparatus according to claim 9, wherein the included angle between the ray beam and the extension direction of the inspection channel is variable in a range of $90\pm\theta°$, where $0<\theta\leq15°$.

11. The radiation inspection apparatus according to claim 6, wherein the step of performing a scanning inspection on a row of a plurality of objects to be inspected by the radiation inspection apparatus comprises at least one of the following steps:
   changing a scanning speed of the radiation inspection apparatus; and
   changing a beam-exit frequency of the ray source.

* * * * *